United States Patent [19]
Kusano et al.

[11] Patent Number: 5,130,963
[45] Date of Patent: Jul. 14, 1992

[54] OPTICAL DISK PLAYER

[75] Inventors: Satoshi Kusano; Toshio Suzuki; Yuji Tawaragi; Noriko Obitsu, all of Tokorozawa, Japan

[73] Assignee: Pioneer Electronic Corporation, Tokyo, Japan

[21] Appl. No.: 660,951

[22] Filed: Feb. 26, 1991

[30] Foreign Application Priority Data

Jul. 19, 1990 [JP] Japan .................................. 2-191451

[51] Int. Cl.$^5$ ............................................. G11B 7/00
[52] U.S. Cl. ............................. 369/44.28; 369/44.32; 369/44.41
[58] Field of Search ................. 250/201.5, 202; 369/44.28, 44.32, 44.33, 44.41, 44.42, 32

[56] References Cited

U.S. PATENT DOCUMENTS

| | | | |
|---|---|---|---|
| 4,476,555 | 10/1984 | Joichi et al. | 369/44.32 |
| 4,589,103 | 5/1986 | Tajima | 369/44.32 |
| 4,707,648 | 11/1987 | Minami | 369/44.41 |
| 4,775,906 | 10/1988 | Miura et al. | 369/44.32 |
| 4,803,675 | 2/1989 | Komatsu | 369/44.28 |
| 4,817,069 | 3/1989 | Shigemori | 369/44.28 |

Primary Examiner—Donald McElheny, Jr.
Attorney, Agent, or Firm—Fleit, Jacobson, Cohn, Price, Holman & Stern

[57] ABSTRACT

An optical disk player using quadrant type photodetector as light receiving means. The phase difference output by the time difference detection method is issued as a tracking error, and a DC component of differential output by the push-pull method is issued as a tilt error, and zero cross of said differential output is detected. By using this detection output for the detection of zero-cross timing on off-track, stable operation of the tracking servo unit is ensured.

1 Claim, 2 Drawing Sheets

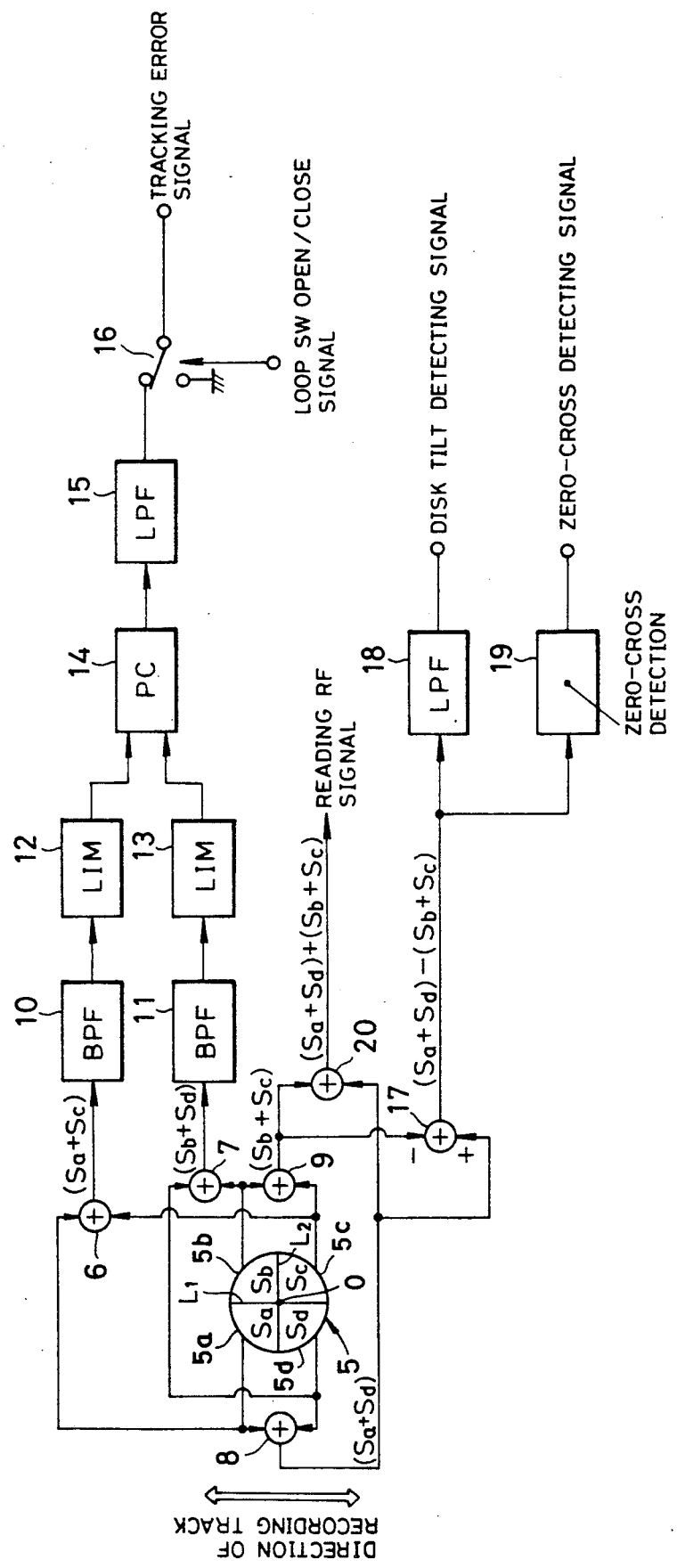

OPTICAL DISK PLAYER

BACKGROUND OF THE INVENTION

1. Field of the Invention

The present invention relates to an optical disk player.

2. Description of Background Information

For the optical disk player used for playing disk type recording medium (hereinafter simply referred as "disk") such as a video disk, a digital audio disk, etc., a tracking servo unit for controlling the recording track is indispensable to ensure accurate tracking by the information reading optical spot on the pickup unit irrespectively of the eccentricity of the disk.

Such a tracking servo unit is designed as a closed servo control system, and it generates a tracking error signal corresponding to the deviation of the information reading optical spot in the radial direction of the disk relative to the recording track of the disk, and it further drives the tracking actuator according to the tracking error signal for deviating the information reading optical spot in the radial direction of the disk. Thus, it performs the position control of the information reading optical spot relative to the recording track.

When the optical spot for reading information jumps the recording track in such a servo unit, the servo loop is kept in opened state and an acceleration signal having the polarity corresponding to the jumping direction is supplied to the tracking actuator. The deceleration signal with an opposite polarity to the acceleration signal is supplied to the actuator for a fixed period of time at the zero-cross timing of tracking error signal level during the jumping so that a certain braking power is provided. Then, the servo loop is closed to lead-in the servo loop (Japanese Patent Application Laid Open No. 2-79228).

As the methods for generating tracking error signal, the three-beam method, push-pull method, time difference detection method, etc. are known. Of these methods, the time difference detection method uses the so-called quadrant type photodetector comprising four photoelectric conversion elements, each of which has photodetecting surface divided into 4 parts, as light receiving means for receiving the reflected light beam from the disk, as it is known from the description in the Japanese Provisional Patent Application Laid Open No. 57-181433. Of the phase difference generated between the outputs of these photoelectric conversion elements, the phase variation component, changing according to the deviation of optical spot for reading information in the radial direction of the disk relative to the recording track, is detected, and this phase variation is issued as the tracking error signal. This method is advantageous in that it is not adversely affected by the deviation of the intensity distribution of the reflected light beam from the disk. On the other hand, in the so-called off-track area between the recording tracks, leakage of RF components of the information reading optical spot of the adjacent track occurs because RF components are used for detection, and correct error signal cannot be obtained. Thus, it is disadvantageous in that the zero-cross timing of the tracking error signal level on off-track becomes unstable.

SUMMARY OF THE INVENTION

An object of the present invention is to provide an optical disk player provided with a zero-cross detection circuit, which can accurately detect the zero-cross timing in the off-track area even when the time difference detection method is adopted for generating the tracking error signal.

An optical disk player according to the present invention comprises: a pickup provided with an objective lens for converging the irradiated light beam on the information recording surface of the disk and with a photodetector for receiving reflected light beam from the information recording surface passed through the objective lens, the photo detector comprising four photoelectric conversion elements with a light receiving surface divided into four parts obtained by dividing two areas divided along the recording track, respectively into two parts in the direction perpendicular to the track, the objective lens and the photodetector being arranged to be integrally movable; a tracking servo unit, including means for detecting a phase variation component varying with an amount of deviation of the irradiated light beam spot relative to the recording track of the disk, of a phase difference generated from the outputs of the four photoelectric conversion elements, for issuing it as a tracking error signal, forming a servo loop for shifting the irradiated light beam spot in the radial direction of the disk according to the tracking error signal; a tilt servo unit for controlling the optical axis of the irradiated light beam to be perpendicular to the information recording surface according to a disk tilt detecting signal, including disk tilt detecting means for obtaining a differential output of sums of the outputs of pairs of the four photoelectric conversion elements divided along the direction of the recording track and for issuing it as the disk tilt detecting signal; and zero-cross detecting means for detecting zero-cross of the differential output; wherein a detection output of the zero-cross detecting means is used as a signal for indicating that irradiated light beam spot is located at an intermediate position between the recording tracks.

In the optical disk player according to the present invention, a quadrant type photodetector consisting of four photoelectric conversion elements together having a light receiving surface divided into four parts is provided as means for receiving reflected light beam from the disk. Based on four detection outputs of this photodetector, a phase difference output obtained by the time difference detection method is issued as a tracking error signal, and a DC component of a differential output obtained by the push-pull method is issued as a disk tilt detecting signal. Further, zero-crossing of the differential output is detected, and a detection output is used for the detection of zero-crossing in an off-track state.

BRIEF DESCRIPTION OF THE DRAWINGS

FIG. 2 is a block diagram showing an arrangement of signal processing system of optical disk player according to the present invention;

DESCRIPTION OF THE PREFERRED EMBODIMENT

In the following, an embodiment of the present invention will be described in detail with reference to the accompanying drawings.

Figure 1:
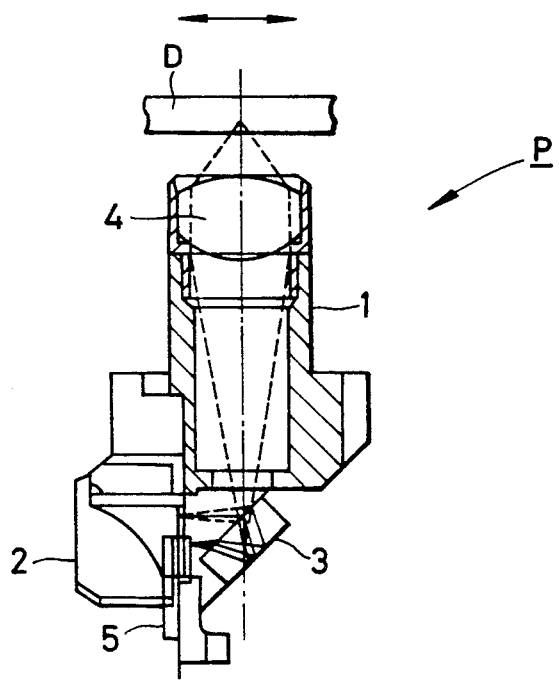
FIG. 1 is a cross-sectional view showing an arrangement of pickup to be used for optical disk player according to the present invention.

FIG. 1 is a cross-sectional view showing an arrangement of a pickup P to be used in the optical disk player of this invention. In this pickup P, there are provided in the body 1 thereof, a laser light source 2 to emit a laser light beam, a mirror 3 for reflecting the laser light beam in the direction of the disk D, an objective lens 4 for converging the incident light beam on the information recording surface of the disk D, and a photodetector 5 for receiving reflected light beam from the disk D passing through the objective lens 4. The body 1 including objective lens 4 and photodetector 5 is disposed to be integrally movable in the radial direction (←→) of the disk when driven by a tracking actuator (not shown). Also, the body 1 is integrally movable in the direction of optical axis by a focus actuator (not shown). Actual arrangement of such pickup P is described in detail in the specification of the Japanese Patent Application Laid Open No. 2-135726 filed by the present applicant.

Next, description is given on an arrangement of signal processing system of optical disk player of this invention with reference to FIG. 2.

First, the photodetector 5 incorporated in the pickup P is, as shown in the figure, a so-called quadrant type photodetector consisting of four photoelectric conversion elements $5a$–$5d$, in which the light receiving surface is divided into four parts by a division line $L_1$ along tangential direction of the track and a division line $L_2$ perpendicular to it. It is arranged in such manner that the center O of the light receiving surface coincides with optical axis of reflected light beam from the disk D when tracking conditions are adequate. Of these four photoelectric conversion elements $5a$–$5d$, the outputs Sa and Sc of the photoelectric conversion elements $5a$ and $5c$ disposed on a diagonal line and the outputs Sb and Sd of the photoelectric conversion elements $5b$ and $5d$ are added by adders 6 and 7. Also, the outputs of the photoelectric conversion elements on both sides the division line $L_1$, that is, the outputs Sa and Sd of the photoelectric conversion elements $5a$ and $5d$ and the outputs Sb and Sc of the photoelectric conversion elements $5b$ and $5c$ are added by adders 8 and 9 respectively.

The adding outputs (Sa+Sc) and (Sb+Sd) of the adder 6 and 7 are supplied to the phase comparator 14 through BPFs (band pass filters) 10 and 11 and the limiters (LIM) 12 and 13. The phase comparator 14 outputs the voltage proportional to the phase difference between two inputs. The phase difference output of the phase comparator 14 is derived as the tracking error signal through LPF (low pass filter) 15. The polarity and the level of the tracking error signal indicate the deviation direction and the deviation of information reading optical spot in the radial direction of the disk relative to the recording track of the disk D. The tracking error signal is selectively supplied to the tracking actuator (not shown) by a loop switch 16.

Figure 3:
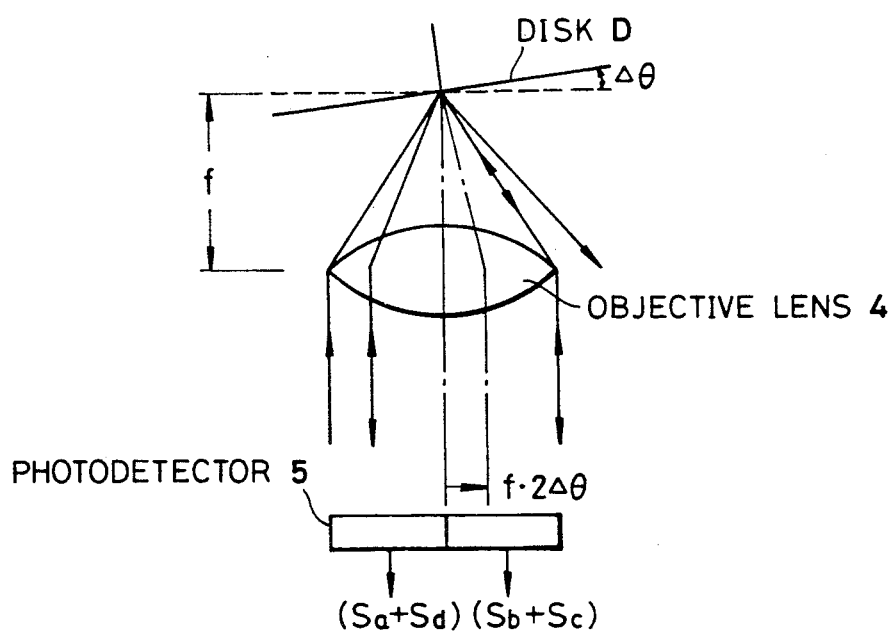
FIG. 3 is a drawing for explaining the relationship between disk tilt and disk tilt detecting signal.

On the other hand, the adding outputs (Sa+Sd) and (Sb+Sc) of the adders 8 and 9 are supplied to the subtractor 17, and the difference between these two outputs is obtained. This difference output {(Sa+Sd)−(Sb+Sc)} is supplied to LPF 20, and its DC component is derived as disk tilt detecting signal. This disk tilt detecting signal indicates the inclination of the information recording surface of the disk D with respect to the optical axis of information reading optical beam. Specifically, as shown in FIG. 3, when the disk D is inclined in radial direction by an angle $\Delta\theta$ from the surface perpendicular to the optical axis of objective lens 4, the optical axis of reflected light beam is shifted, and the beam spot on the light receiving surface of quadrant type photodetector 5 is also displaced. Thus, DC offset corresponding to the inclination of the disk D is generated on the differential output {(Sa+Sd)−(Sb+Sc)} of the sums of outputs of the four photoelectric conversion elements on both sides of the division line $L_1$ along the tangential direction of the track. This displacement of the beam spot is $f \cdot 2\Delta\theta$ where f is the distance between the objective lens 4 and the disk D.

The disk tilt detecting signal thus obtained is supplied to the tilt actuator (not shown) of tilt servo mechanism, which controls the optical axis of the optical beam for reading information to the direction perpendicular to the information recording surface of the disk D. As the tile servo mechanism, the one disclosed in the Japanese Provisional Utility Model Application Laid Open No. 59-168835 may be used. The disk tilt detection signal is used as a driving signal of the tilt motor of this tilt servo mechanism.

In this way, when tilt servo is locked, the differential outputs {(Sa+Sd)−(Sb+Sc)} is 0, whereas, when tracking servo loop is opened and track jumping is performed, a difference is generated between (Sa+Sd) and (Sb+Sc) by the diffraction by the pit of the disk D. this is the principle equivalent to means for generating tracking error signal as it is generally called the push-pull method.

In general, it is widely known that an offset is generated by relative movement of objective lens 4 and photodetector 5 in the receiving light quantity of two areas divided along the direction of the recording track in addition to the offset component caused by disk tilt. In the present invention, however, it is not the offset caused by the tilt when tilt servo is locked. Because the objective lens 4 and photodetector 5 are integrated, the offset caused by relative movement of these two can be neglected.

Thus, the differential output {(Sa+Sd)−(Sb+Sc)} of the subtractor is also supplied to the zero-cross detecting circuit 19, which consists of zero level comparator. The polarity and the level of this differential output indicates deviation direction and deviation of the information reading optical spot in radial direction of the disk in relation to the recording track of the disk D. Accordingly, it is possible according to this differential output to detect that the information reading optical spot has reached in the intermediate position on-track and off-track in the zero-cross detecting circuit 19. Therefore, if the zero-cross detecting signal, i.e. the detection output of the zero-cross detection circuit 19 is used, it is possible to detect the timing accurately and at all times to give braking power to the tracking actuator during jumping, i.e. zero-cross timing on off-track.

The adding outputs (Sa+Sd) and (Sb+Sc) of the adders 8 and 9 are further supplied to the adder 21, and the sum of these two outputs in obtained. Then, the total output {(Sa+Sd)+(Sb+Sc)} of the photoelectric conversion elements Sa - Sd is derived as a reading RF signal.

Further, in the above embodiment, a straight line was used as the division line of the photodetector, whereas there is no special restriction for this. For example, as disclosed in the Japanese Provisional Patent Application laid Open No. 63-285732, the photodetector may be divided by a curve provided by projecting the straight line in parallel or perpendicular to the recording track on the disk through objective lens or through optical components, which generate the astigmatism for the focussing operation.

As described above, in the optical disk player according to the present invention, a quadrant type photodetector consisting of four photoelectric conversion elements with light receiving surface divided into four parts is used as means for receiving reflected light beam from the disk. The phase difference output obtained by the time difference detection method based on four detection outputs of this photodetector is issued as tracking error signal, and DC components of differential output obtained by the push-pull method is issued as disk tilt detection signal. Further, zero-cross of this differential output is detected, and the detection output is used for zero- cross detection on off-track. Accordingly, zero-cross time on off-track can be accurately detected even when time difference detection method is used for generating the tracking error signal.

What is claimed is:

1. An optical disk player, comprising;

a pickup provided with an objective lens for converging an irradiation light beam on an information recording surface of a disk shaped recording medium and with a photodetector for receiving a reflected light beam from said information recording surface passing through said objective lens, said photodetector comprising four photoelectric conversion elements together having a light receiving surface divided into four parts obtained by respectively dividing two parts divided along the recording track, into two parts in a direction perpendicular to the track, said objective lens and said photodetector being arranged to be integrally movable;

a tracking servo unit, including means for detecting a phase variation component varying with an amount of deviation of a spot of said irradiation light beam relative to a recording track of the disk shaped recording medium, of a phase difference generated from the outputs of said four photoelectric conversion elements, for issuing said phase variation component as a tracking error signal, forming a servo loop for controlling a deviation of said spot of said irradiation light beam in a radial direction of the disk shaped recording medium according to said tracking error signal;

a tilt servo unit for controlling an optical axis of said irradiation light beam to be perpendicular to said information recording surface according to a disk tilt detecting signal, including disk tilt detecting means for obtaining a differential output of sums of the outputs of pairs of said four photoelectric conversion elements divided along the direction of the recording track and for issuing it as said disk tilt detecting signal, further; and zero-cross detecting means for detecting zero-cross of said differential output, wherein a detection output of said zero-cross detecting means is used as signal for indicating that irradiated light beam spot is located at an intermediate position between the recording tracks.

* * * * *